United States Patent [19]
Becker

[11] Patent Number: 5,624,288
[45] Date of Patent: Apr. 29, 1997

[54] FIELD-REPLACEABLE SOCKET FOR SEISMIC CONNECTOR

[75] Inventor: Timothy D. Becker, Cypress, Tex.

[73] Assignee: Houston Geophysical Products, Inc., Houston, Tex.

[21] Appl. No.: 368,300

[22] Filed: Jan. 3, 1995

[51] Int. Cl.[6] ............................................. H01R 13/187
[52] U.S. Cl. ............................................ 439/843; 439/784
[58] Field of Search .............................. 439/278–281, 439/675, 578–585, 805, 842, 843, 851, 856, 784

[56] References Cited

U.S. PATENT DOCUMENTS 2,391,425  12/1945  Korn ........................................ 439/843
4,431,254   2/1984  Cartesse .................................. 439/675
4,758,175   7/1988  Didier et al. ............................ 439/281
4,797,126   1/1989  Botka ...................................... 439/843

*Primary Examiner*—David L. Pirlot
*Attorney, Agent, or Firm*—Bush, Riddle & Jackson

[57] ABSTRACT

A geophone connector assembly includes a body having a socket that includes a tubular mandrel, a female contact assembly positioned in the mandrel and having resilient fingers surrounded by a sleeve member and arranged to receive the pin of a mating connector, and a threaded bore in the mandrel arranged to receive a threaded shank on the inner end of the female contact assembly to enable removal and replacement of the contact assembly as a unit in the field in the event of damage thereto.

4 Claims, 2 Drawing Sheets

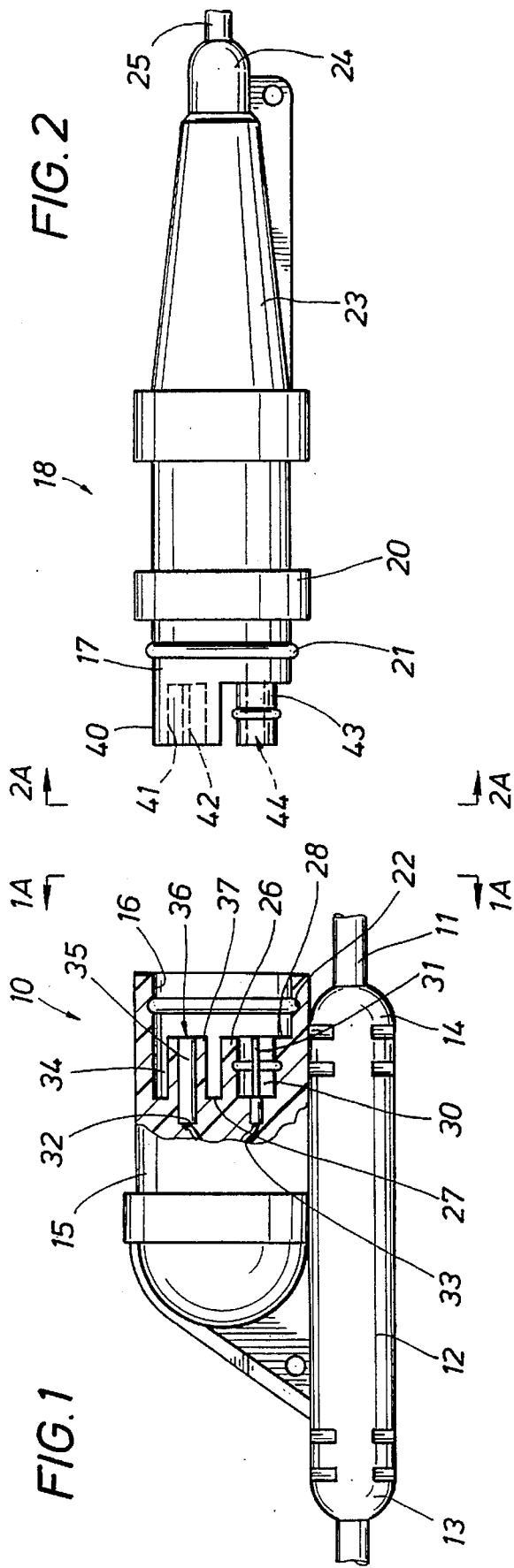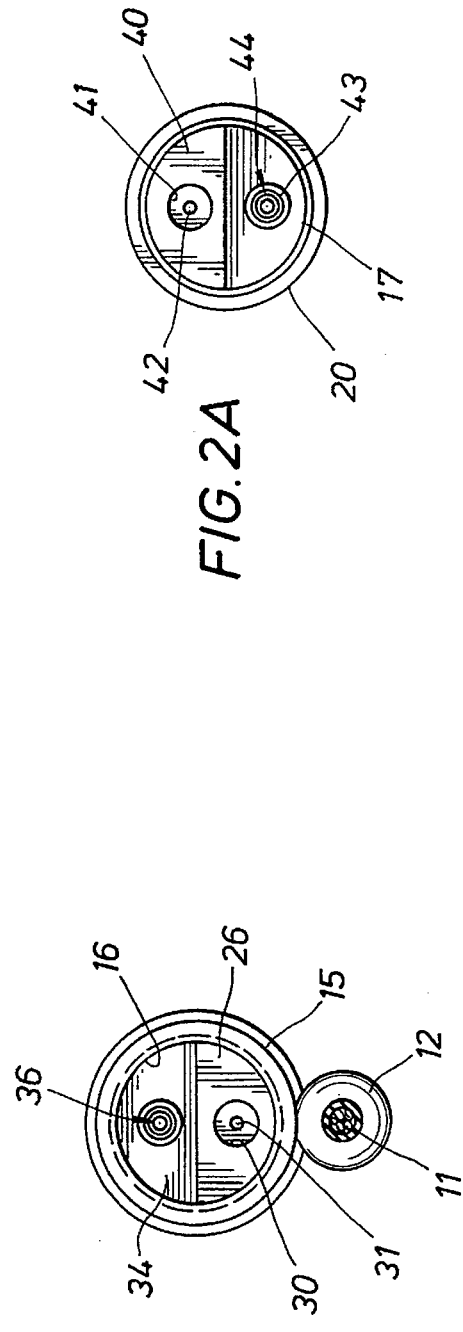

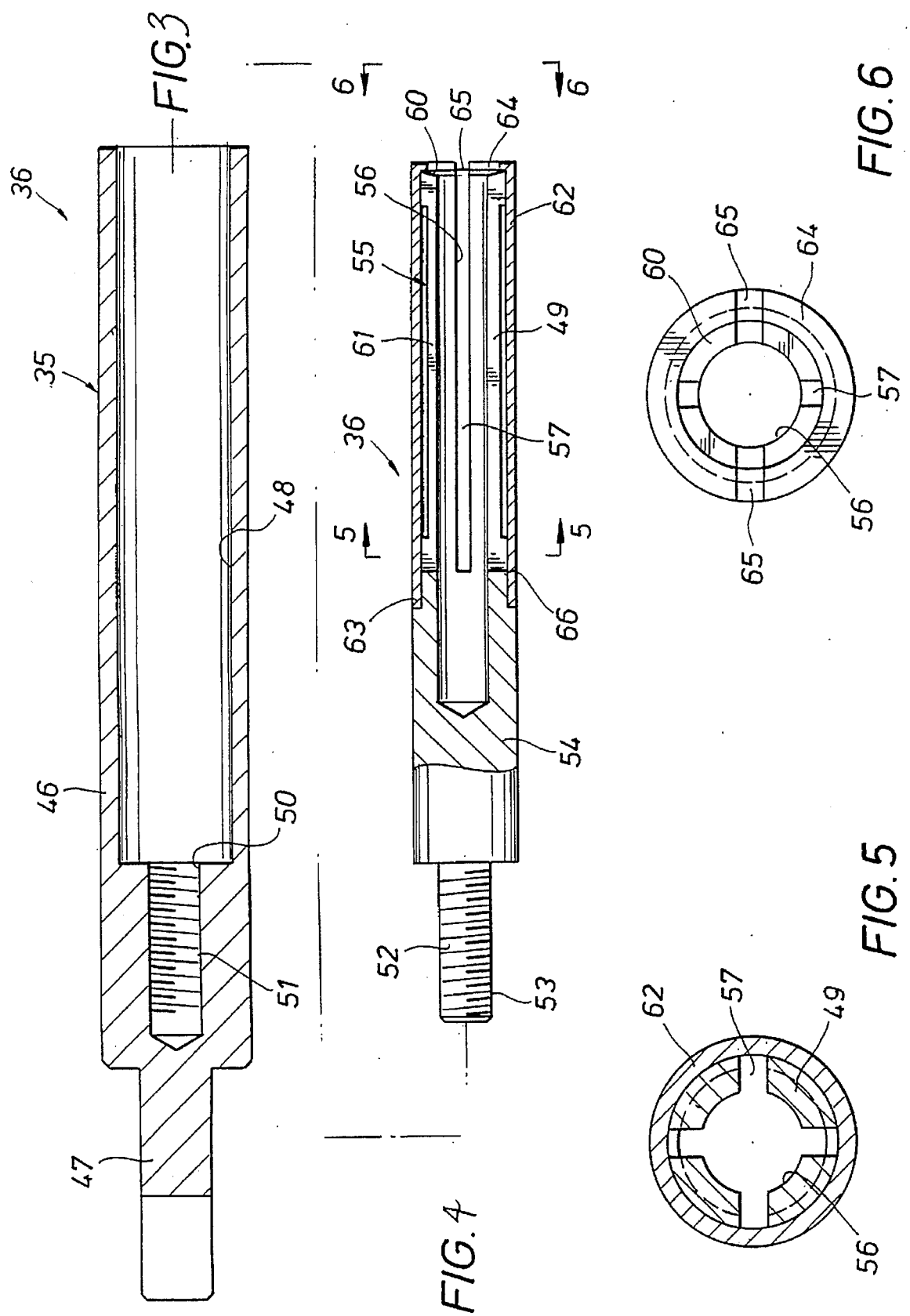

5,624,288

FIELD-REPLACEABLE SOCKET FOR SEISMIC CONNECTOR

FIELD OF THE INVENTION

This invention relates generally to electrical connectors used in making land seismic surveys, and particularly to a connector of the type described which has a unique replaceable socket contact which enables quick and simplified repair of the connector in the field.

BACKGROUND OF THE INVENTION

Most all electrical connectors that are used to connect geophones at spaced locations along a seismic cable use one type or another of a pin and socket arrangement. Although modern connector structures are generally quite reliable, the female socket or receptacle usually is surrounded by an integral part of the molded connector body. When the socket fails for any reason, the entire connector assembly must be replaced because there is no way to remove the socket without damaging the molded body. On the other hand it is highly desirable to be able to repair a geophone string in the field in a simple and reliable manner so that a seismic survey can proceed with a minimum of downtime in the event of a loss of electrical continuity at some point in the string.

An object of the present invention is to provide a new and improved seismic electrical connector having a female socket assembly that is field replaceable so that the entire connector need not be replaced in the event a socket fails for one reason or another.

SUMMARY OF THE INVENTION

This and other objects are attained in accordance with the present invention through the provision of a seismic connector assembly or takeout including a molded body having a pair of contacts including a socket means with which a male pin can be mated. The socket means includes a metal mandrel which defines an internal bore and a threaded counterbore at the inner end thereof, and a generally tubular contact assembly having a threaded rear shank that is screwed into such threaded counterbore. The contact assembly includes a plurality of circumferentially spaced, resilient spring fingers on the outer portion thereof formed by longitudinal slots which extend from its outer end for less than the full length thereof. The fingers are surrounded by a sleeve which is fixed to the contact member and which has diametrically opposed, shallow slots in its outer end to enable a screw driver or the like be used to thread the contact member into, or remove it from, the mandrel. Thus if the contact assembly is damaged in some way in use, it can be easily replaced by a new one and the entire connector assembly does not have to be discarded.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings in which:

FIG. 1 is a side elevational view, with some fragmentary portions in section, of a female take-out connector assembly for a geophone string;

FIG. 1A is an end view showing the pin and socket of the female connector assembly of claim 1;

FIG. 2 is a view similar to FIG. 1 of the male connector assembly;

FIG. 2A is an end view of the pin and socket of the male connector of FIG. 2;

FIG. 3 is an enlarged sectional view of the mandrel for the female contact;

FIG. 4 is an enlarged cross-sectional view of the replaceable female contact which is constructed in accordance with this invention;

FIG. 5 is a further enlarged cross-section on line 5—5 of FIG. 4; and

FIG. 6 is a right end view of the socket assembly shown in FIG. 4.

DETAILED DESCRIPTION OF A PREFERRED EMBODIMENT

Referring initially to FIG. 1, a female electrical connector 10 which is molded onto a geophone cable 11 includes a tubular base 12 having stress relief sections 13, 14 at each end. A generally tubular housing 15 which is joined to the base 12 as shown is formed with an outwardly opening recess 16 that is adapted to receive the front portion 17 of a companion male connector 18. An outwardly directed annular shoulder 20 on the connector 18 limits movement of the front portion 17 into the recess 16, and a raised annular rib 21 is positioned in an internal groove 22 in the recess 16 to provide a seal that prevents entry of moisture. The rear portion 23 of the connector 18 can be conically tapered as shown, and joined to a stress relief portion 24 that surrounds a leader cable 25. The cable 25 extends to a typical geophone (not shown) having a sensor that provides an output signal when an acoustic wave passes it. The sensor usually is mounted on a housing having a spike that extends into the ground so that a number of such geophones can be positioned at spaced locations along a survey line.

As shown in FIGS. 1 and 1A, the recess 16 in the housing 15 is defined in part by the outer walls of a semi-circular section 26 that extends from the rear wall 27 of the recess to a wall 28 that is located inward of the groove 22. A bore 30 in the center of the section 26 receives a contact pin 31 whose rear portion projects into the section 32 of the body and has a conductor wire 33 electrically connected thereto. The open semi-circular region 34 of the recess 16 receives the outer end portion 35 of a female contact assembly 36 that is constructed in accordance with the present invention. The end portion 35 has a sheath 37 molded therearound whose inner end is integral with the housing 15. As shown in FIGS. 2 and 2A, the mating structure of the male connector 18 includes a semicircular portion 40 having a bore 41 that receives a pin connector 42, and an outwardly extending sheath 43 that surrounds a female contact assembly 44. The bores 30 and 41 and the sheaths 37 and 43 have coacting annular raised ribs and recess, as shown, that seal the contacts against entry of moisture when the connector assemblies 10 and 18 are made up.

As shown in FIG. 3, each of the female contact assemblies 36, 44 includes a generally tubular metal body or mandrel 46 having a reduced diameter rear portion 47 to which the end of a conductor wire is connected by any suitable means. The bore 48 of the mandrel 46 extends rearward to a reduced diameter counterbore 50 which is threaded at 51. A female contact assembly 36 or 44 (FIG. 4) includes a rear section or pin 52 having external threads 53, and an enlarged diameter central section 54 which is sized to fit snugly and slidably in the bore 48 of the mandrel 46. The outer section 55 of the contact 36 has a reduced external diameter and a pin-receiving bore 56. The section 55 is divided into a plurality of circumferentially spaced, resilient fingers 49 by angularly spaced longitudinal slots 57 (FIG. 5) that open through the outer end of the section 55. The outer end surface 60 of each finger 49 is chamfered as shown. The mid portion 61 of each finger 49 has a reduced outer diameter, and can be bowed slightly inward so that such portion is flexed outward by the male pin 42 during make-up.

A protective sleeve 62 having the same outer diameter as the central section 54 is slid over the fingers 49 and force-fitted onto the outer portion of the section 54 until its inner end abuts a shoulder 63. The outer end 64 of the sleeve 62 also is chamfered to have its surface aligned with those on the outer ends of the fingers 49 in order to guide the outer end of the pin connector into the bore 56 of the fingers. Diametrically opposed slots 65 in the outer end 64 of the sleeve 62 enable a blade screwdriver to be used to make up or release the threads 51, 52. The force-fit of the sleeve 62 onto the section 54 co-rotatively couples the sleeve 62 and the contact assembly 36 together.

OPERATION

In use and operation, the leads 33 are connected to the respective rear terminals of the pin 31 and the mandrel 46 for the connector 15, and to a respective one of a pair of conductor wires in the cable 11. The pin 31 and mandrel 46 then are held in a suitable fixture as the housing 15, the base 12 and the relief sections 13, 14 are injection molded to the configurations shown using a suitable elastomer. The male connector assembly 18 is made in essentially the same way. Then the socket contact assemblies 36, assembled as shown in FIG. 4, are inserted into the respective mandrels 46 and the threads 53 and 51 engaged by using a small blade type screwdriver which fits the slots 65. The threads 53, 51 provide axial cams for this purpose. Then the front portion 17 of the male assembly 18 is pushed into the bore 16 of the housing 15 with the semicircular portion 40 aligned with the companion recessed region 34 of the female assembly 10, whereby the pins 42 and 31 engage the respective sockets 36 and 44. When the assemblies 10 and 18 are fully engaged, the various seal ribs engage under modest compression to make the connector water-proof.

Should a contact assembly 36 become damaged in use, for example through breaking or bending of one or more of the fingers 61, the connector can be repaired even in the field in only a few seconds. The damaged assembly 36 or 44 is screwed out of its mandrel 46 and replaced by a new one. There is no need to ship the cable back to a manufacturing facility where the connector must be cut up, repaired and remolded, or discarded in favor of a new assembly, as in the past.

It now will be recognized that a new and improved connector assembly for use in seismic survey work has been disclosed, and that the assembly has a female contact which can be quickly and easily replaced in the field in case of damage. Since certain changes or modifications may be made in the disclosed embodiment without departing from the inventive concepts involved, it is the aim of the appended claims to cover all such changes and modifications falling within the true spirit and scope of the present invention.

What is claimed is:

1. An electrical connector for use in seismic exploration or the like, comprising:

a body;

a tubular member on said body defining an axial bore having an open outer end and closed inner end; contact means mounted in said bore and including an elongated generally tubular receptacle, said receptacle having an inner portion, and an outer portion having angularly spaced slots extending inwardly from the outer end thereof to divide said outer portion into a plurality of longitudinally extending resilient fingers; and a sleeve member mounted around said fingers to provide lateral support therefor, said sleeve member being fixed to said inner portion of said receptacle, a threaded counterbore at said inner end of said tubular member, a threaded shank on said inner portion of said receptacle and engageable with said threaded counterbore to releasably secure said contact means in said bore of said tubular member, said sleeve member having an outer end portion that extends outward of the adjacent outer ends of said fingers, and further including diametrically opposed axial slots in the outer end portion of said sleeve member for operating said threaded shank and counterbore.

2. The connector of claim 1 further including a tubular elastomer cover forming a part of said body molded around said tubular member.

3. The connector of claim 1 wherein each of said fingers has a reduced diameter central portion and an enlarged diameter head portion, said head portions engaging an inner wall of said sleeve member to limit outward movement thereof.

4. The connector of claim 3 further including conical outer end surfaces on said fingers and said sleeve member for aligning the end of a pin member to enter the axial bore defined by said fingers.

* * * * *